(12) United States Patent
Hwang

(10) Patent No.: US 7,863,965 B2
(45) Date of Patent: Jan. 4, 2011

(54) TEMPERATURE SENSOR CIRCUIT AND METHOD FOR CONTROLLING THE SAME

(75) Inventor: Mi Hyun Hwang, Anyang-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 43 days.

(21) Appl. No.: 12/454,256

(22) Filed: May 13, 2009

(65) Prior Publication Data

US 2010/0007404 A1    Jan. 14, 2010

Related U.S. Application Data

(63) Continuation-in-part of application No. 12/001,666, filed on Dec. 12, 2007, now abandoned.

(30) Foreign Application Priority Data

Jun. 27, 2007    (KR) .................... 10-2007-0063933

(51) Int. Cl.
    *H01L 35/00*    (2006.01)
(52) U.S. Cl. ................ 327/513; 327/321; 327/539
(58) Field of Classification Search ................ 323/313; 327/309, 321, 327, 328, 512, 513, 539
    See application file for complete search history.

(56) References Cited

U.S. PATENT DOCUMENTS

| 6,529,563 | B1 | 3/2003 | Mosinskis et al. |
| 6,888,397 | B2 | 5/2005 | Tsuchiya |
| 7,107,178 | B2 | 9/2006 | Won et al. |
| 7,145,380 | B2 | 12/2006 | Hsu |
| 7,214,910 | B2 * | 5/2007 | Chen et al. ................ 219/494 |
| 7,423,473 | B2 | 9/2008 | Kim |
| 7,560,978 | B2 * | 7/2009 | Byeon et al. ................ 327/536 |

FOREIGN PATENT DOCUMENTS

| KR | 10-0668869 | 1/2007 |
| KR | 10-2007-0036648 | 4/2007 |
| KR | 10-0808054 | 2/2008 |
| KR | 10-2008-0029299 | 4/2008 |

* cited by examiner

*Primary Examiner*—Jeffrey S Zweizig
(74) *Attorney, Agent, or Firm*—John P. White; Cooper & Dunham LLP

(57) ABSTRACT

A temperature sensor circuit comprises a first reference voltage generator configured to generate a first signal that linearly varies with temperature and a first reference voltage signal that maintains a certain level irrespective of temperature, a second reference voltage generator configured to generate a second reference voltage signal by using the first reference voltage signal, and a controller configured to compare the first signal with the second reference voltage signal and control a voltage level of the first signal according to a comparison result.

10 Claims, 5 Drawing Sheets

TEMPERATURE SENSOR CIRCUIT AND METHOD FOR CONTROLLING THE SAME

This application is a continuation-in-part of U.S. Ser. No. 12/001,666, filed Dec. 12, 2007, now abandoned the contents of which are hereby incorporated by reference.

BACKGROUND

The present disclosure relates to a semiconductor memory device, and more particularly, to a temperature sensor circuit for measuring internal temperature to output digital code or changing a self-refresh period according to the measured internal temperature.

Generally, a temperature sensor circuit utilizes a bandgap reference voltage generator. The bandgap reference voltage generator stably supplies a constant voltage in spite of the variation of temperature or external voltage. The bandgap reference voltage is widely used in a variety of applications requiring a reference voltage, for example, semiconductor memory devices or on-die thermal sensors.

The bandgap reference voltage generator includes a base-emitter voltage ($V_{BE}$) generating unit and a thermal voltage ($V_T$) generating unit. The base-emitter voltage generating unit is implemented with a diode-connected bipolar transistor and supplies a constant diode voltage. The thermal voltage ($V_T$) generating unit generates a voltage proportional to KT (where K is Boltzmann's constant and T is absolute temperature) using the difference of base-emitter voltages ($V_{BE}$) of two bipolar transistors. The bandgap reference voltage generator minimizes a temperature coefficient by generating a reference voltage ($V_{REF}$) signal, where $V_{REF}=V_{BE}+KV_T$.

The bandgap reference voltage generator is named in the sense that the reference voltage is substantially equal to a bandgap voltage of silicon (Si).

FIG. 1 illustrates a circuit diagram of a conventional temperature sensor circuit, FIG. 2 illustrates a graph of an error rate according to the change of temperature in the conventional temperature sensor circuit of FIG. 1, and FIG. 3 illustrates a graph of a base-emitter voltage signal with respect to temperature in the conventional temperature sensor of FIG. 1.

Referring to FIG. 1, the conventional temperature sensor circuit includes a first reference voltage generator 100 and a second reference voltage generator 200. The first reference voltage generator 100 generates a temperature sensing voltage VTEMP that linearly varies with temperature and a first reference voltage signal VREF that maintains a certain level irrespective of a variation of temperature. The second reference voltage generator 200 generates second reference voltage signals VULIMIT and VLLIMIT by using the first reference voltage signal VREF. Here, a level of the second reference voltage signal VULIMIT is higher than that of the second reference voltage signal VLLIMIT.

The temperature sensing voltage VTEMP inversely proportional to temperature is used for temperature sensing. The second reference voltage signals VULIMIT and VLLIMIT are used as a biasing voltage of an analog-to-digital converter (ADC). The ADC converts the temperature sensing voltage VTEMP into a digital code.

In order for accurate temperature measurement, the input range of the ADC is defined by the reference voltages of the bandgap reference voltage generator. An upper limit of the input voltage is defined as VULIMIT and a lower limit of the input voltage is defined as VLLIMIT. The ADC compares a DAC voltage with the temperature sensing voltage VTEMP to determine a digital code. Temperature information is determined according to the digital code. At this point, errors such as Process-Voltage-Temperature (PVT) variation or comparator offset may occur during this procedure.

To reduce these errors, a trimming process is performed at a high temperature. After setting an external temperature to approximately 90° C., the trimming process is performed to make the reference voltage signal VLLIMIT have the same voltage level as the temperature sensing voltage VTEMP. After the trimming process, an error rate decreases at a high temperature, e.g., approximately 90° C.

On the other hand, the error rate increases as temperature decreases. The error rate at a low temperature can be reduced by performing the trimming process once again. However, this involves increasing test time.

BRIEF SUMMARY

In an aspect of the present disclosure, a temperature sensor circuit includes a first reference voltage generator configured to generate a first signal that linearly varies with temperature and a first reference voltage signal that maintains a certain level irrespective of temperature, a second reference voltage generator configured to generate a second reference voltage signal by using the first reference voltage signal, and a controller configured to compare the first signal with the second reference voltage signal and control a voltage level of the first signal according to the comparison result.

The first signal may be a base-emitter voltage signal with a negative temperature coefficient.

The controller may be configured to clamp the first signal to a voltage level of the second reference voltage signal when the first signal is higher than the second reference voltage signal.

In another aspect of the disclosure, a method for controlling a temperature sensor circuit includes generating a first signal that linearly varies with temperature and a first reference voltage signal that maintains a certain level irrespective of temperature, generating a second reference voltage signal by using the first reference voltage signal, and comparing the first signal with the second reference voltage signal and controlling a voltage level of the first signal according to the comparison result.

BRIEF DESCRIPTION OF THE DRAWINGS

The above and other features of the subject matter of the present disclosure will be more apparent from the following detailed description taken in conjunction with the accompanying drawings, in which.

DESCRIPTION OF EXEMPLARY EMBODIMENTS

Hereinafter, a temperature sensor circuit and a method for controlling the same in accordance with examples and exemplary embodiments of the present invention will be described in detail with reference to the accompanying drawings.

Figure 4:
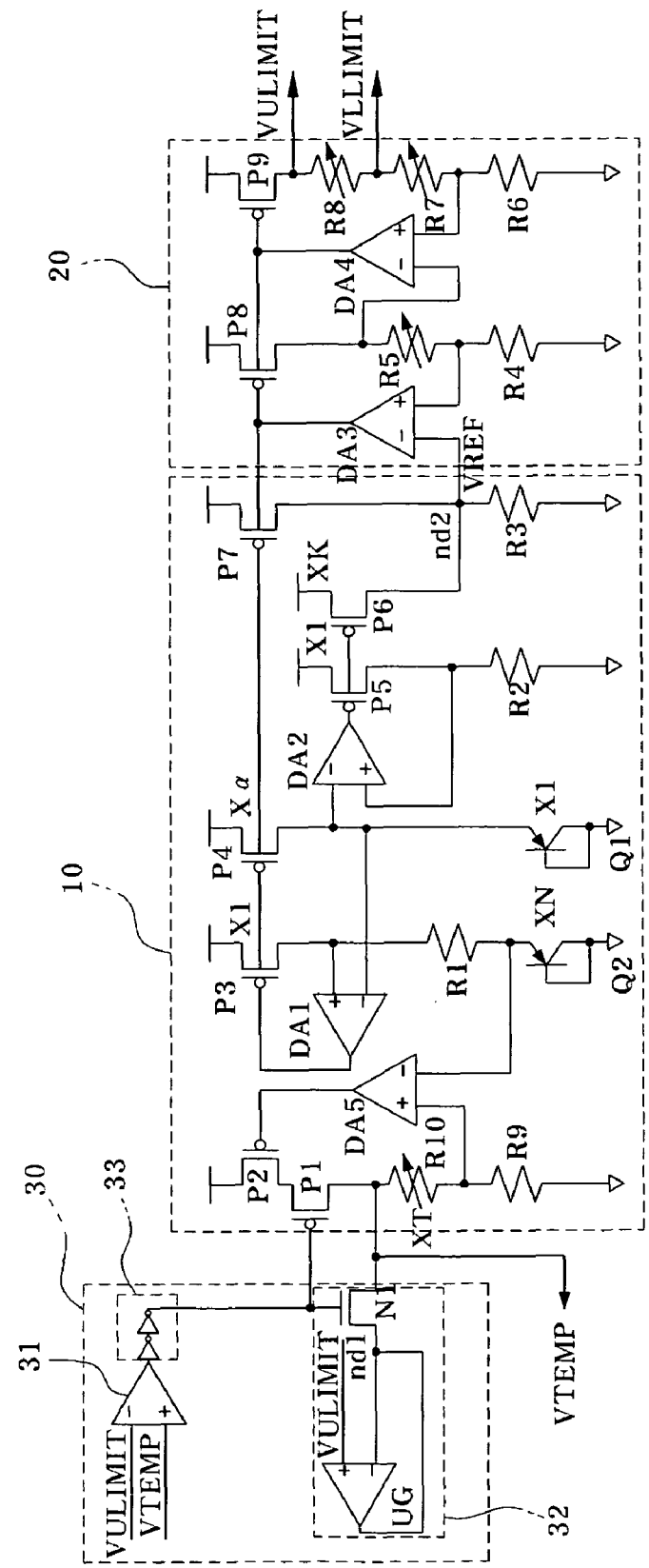
FIG. 4 illustrates a circuit diagram of a temperature sensor circuit according to an exemplary embodiment of the present invention.
Figure 5:
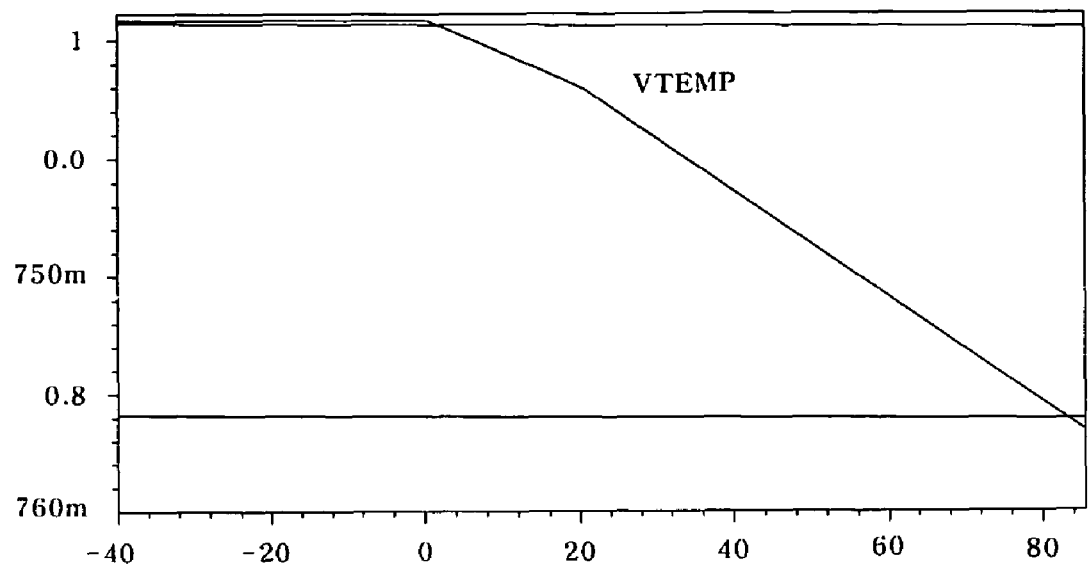
FIG. 5 illustrates a graph of a base-emitter voltage signal with respect to temperature in the temperature sensor circuit of FIG. 4.
Figure 6:
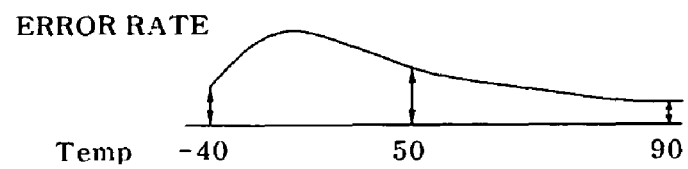
FIG. 6 illustrates a graph of an error rate according to the change of temperature in the temperature sensor circuit of FIG. 4.
Figure 7:
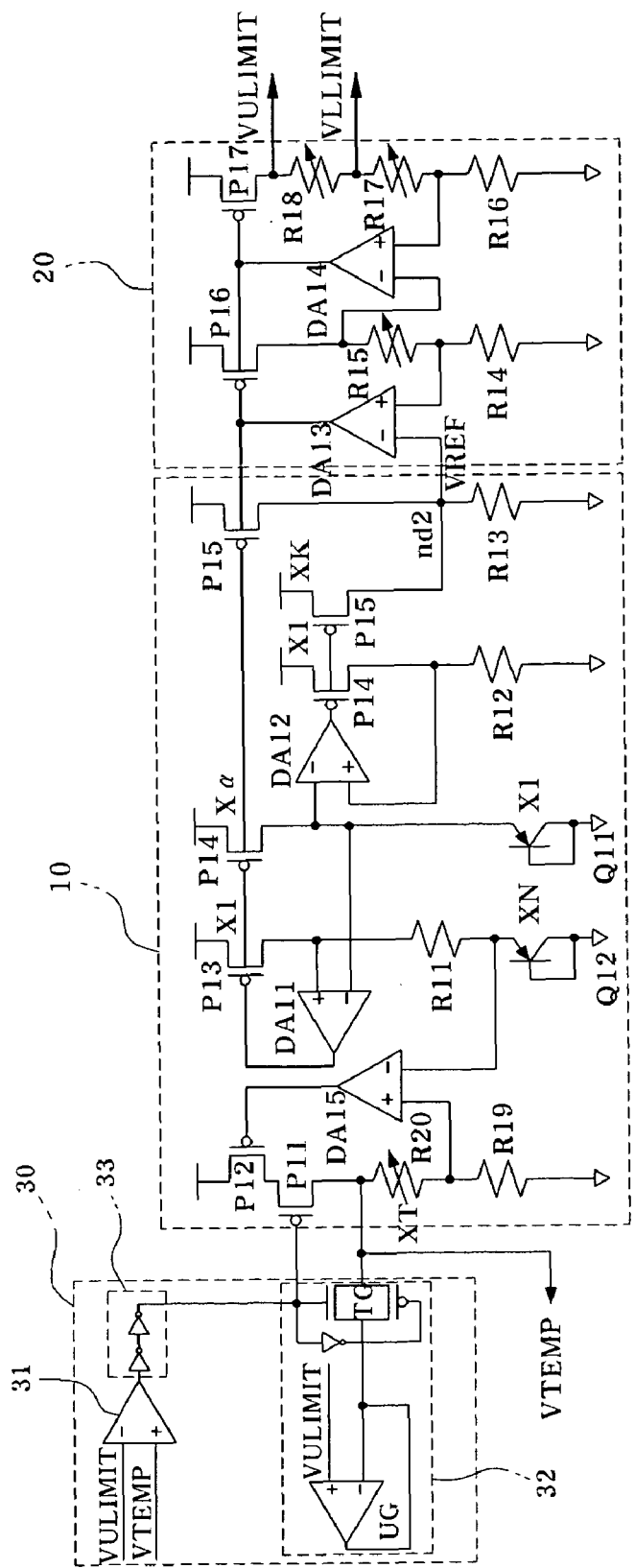
FIG. 7 illustrates a circuit diagram of temperature sensor circuit according to another exemplary embodiment of the present invention.

FIG. 4 illustrates a circuit diagram of a temperature sensor circuit according to an exemplary embodiment of the present invention, FIG. 5 illustrates a graph of a base-emitter voltage signal with respect to temperature in the temperature sensor circuit of FIG. 4, FIG. 6 illustrates a graph of an error rate according to the change of temperature in the temperature sensor circuit of FIG. 4, and FIG. 7 illustrates a circuit diagram of temperature sensor circuit according to another exemplary embodiment of the present invention.

Referring to FIG. 4, the temperature sensor circuit includes a first reference voltage generator 10, a second reference voltage generator 20, and a controller 30. The first reference voltage generator 10 generates a temperature sensing voltage VTEMP that linearly varies with temperature and a first reference voltage signal VREF that maintains a certain level irrespective of a variation of temperature. The second reference voltage generator 20 generates second reference signals VULIMIT and VLLIMIT by using the first reference signal VREF. The controller 30 compares the temperature sensing voltage VTEMP with the second reference voltage VULIMIT and controls a level of the temperature sensing voltage VTEMP according to the result of the comparison. Here, a level of the second reference voltage signal VULIMIT is higher than that of the second reference voltage signal VLLIMIT.

The temperature sensing voltage VTEMP has a negative temperature coefficient. That is, the temperature sensing voltage VTEMP is inversely proportional to temperature.

Figure 1:
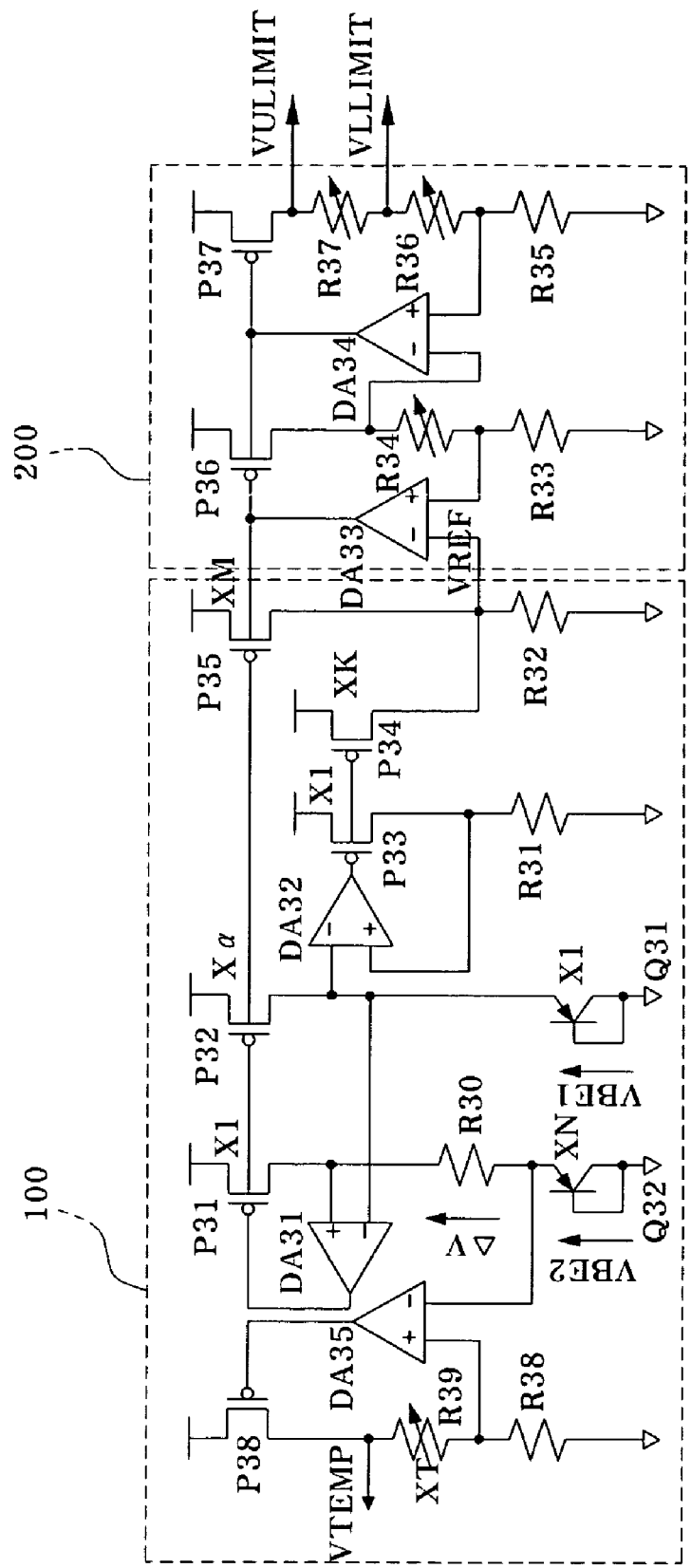
FIG. 1 illustrates a circuit diagram of a conventional temperature sensor circuit.
Figure 2:
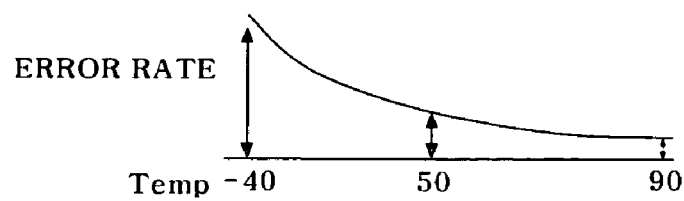
FIG. 2 illustrates a graph of an error rate according to the change of temperature in the conventional temperature sensor circuit of FIG. 1.
Figure 3:
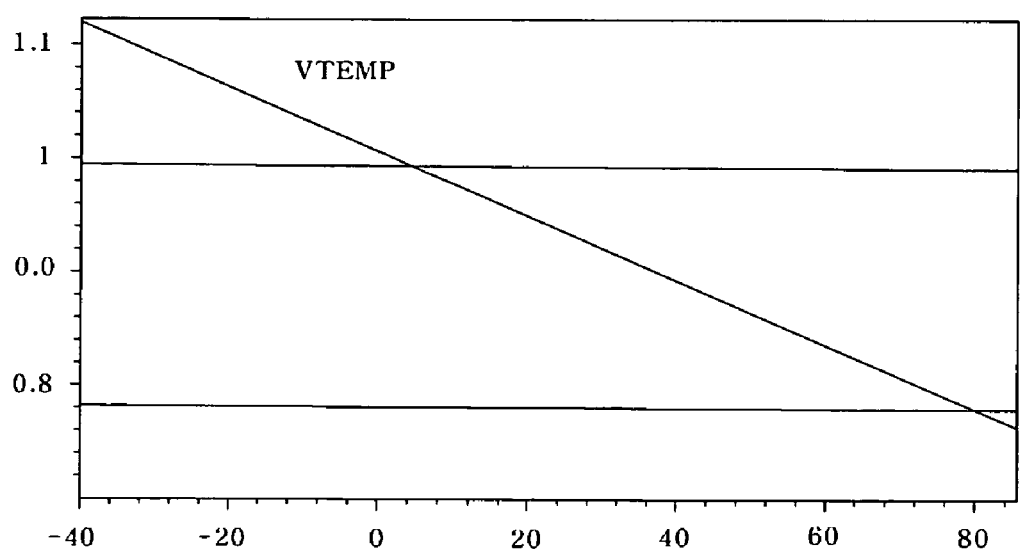
FIG. 3 illustrates a graph of a base-emitter voltage signal with respect to temperature in the conventional temperature sensor of FIG. 1.

The first reference voltage generator 10 generates a reference voltage ($V_{REF}$) signal, where $V_{REF}=V_{BE}+KV_T$. More specifically, the first reference voltage generator 10 includes a base-emitter voltage ($V_{BE}$) generating unit and a thermal voltage ($V_T$) generating unit. The base-emitter voltage ($V_{BE}$) generating unit is implemented with a diode-connected bipolar transistor (Q1,Q2) and supplies a constant diode voltage. The thermal voltage ($V_T$) generating unit generates a voltage proportional to KT (where K is Boltzmann's constant and T is absolute temperature) using the difference of base-emitter voltages ($V_{BE}$) of two bipolar transistors. The second reference voltage generator 20 generates the second reference voltage signals VULIMIT and VLLIMIT by using the first reference voltage signal VREF. Since the structures of the first and second reference voltage generators 10 and 20 are similar to those of FIG. 1, their detailed description will be omitted for conciseness.

The controller 30 clamps the temperature sensing voltage VTEMP to a voltage level of the second reference voltage signal VULIMIT when the temperature sensing voltage VTEMP is higher than the second reference voltage signal VULIMIT.

The controller 30 comprises a comparator 31, a buffer 33, and a clamper 32. The comparator 31 compares the temperature sensing voltage VTEMP with the second reference voltage signal VULIMIT. The buffer 33 buffer an output signal of the comparator 31. The clamper 32 clamps the temperature sensing voltage VTEMP to the voltage level of the second reference voltage signal VULIMIT.

The clamper 32 comprises a unit gain buffer UG and a driver N1. The unit gain buffer UG is configured to buffer an input signal in response to the second reference voltage signal VULIMIT, and the driver N1 is configured to output an output signal of the unit gain buffer UG as the temperature sensing voltage VTEMP in response to an output signal of the comparator 31. The unit gain buffer UG performs buffering until a level of a node nd1 reaches to the level of the second reference voltage signal VULIMIT.

As illustrated in FIG. 7, the clamper 32 may comprise a unit gain buffer UG and a transmission gate TG. The unit gain buffer is configured to buffer the second reference voltage signal VULIMIT, and the transmission gate is configured to transmit the output signal of the unit gain buffer as the temperature sensing voltage VTEMP in response to the output signal of the comparator 31.

The controller 30 having the above-mentioned structure clamps the voltage signal VTEMP to the level of the second reference voltage signal VULIMIT when the level of the temperature sensing voltage VTEMP is higher than that of the second reference voltage signal VULIMIT.

An operation of the temperature sensor circuit according to the exemplary embodiment of FIG. 4 will be described below.

First, considering an operation of the first reference voltage generator 10, it controls PMOS transistors P3, P4, P7, P8 and P9 by amplifying a difference in the base-emitter voltages between the two bipolar transistors Q1 and Q2. The base-emitter voltage of the bipolar transistor Q1 and Q2 operating such as a diode becomes lower when the temperature increases. Since the size magnification of the bipolar transistor Q1 is N times that of the bipolar transistor Q2, a decrease extent of the base-emitter voltage of the bipolar transistor Q1 is higher than that of the base-emitter voltage of the bipolar transistor Q2 when the temperature increases. Subsequently, the difference between the base-emitter voltages of the two bipolar transistors Q1 and Q2 is lower and thus the currents flowing through the PMOS transistors P3, P4, P7, P8, and P9 are increased in accordance with an output level of a differential amplifier DA1 amplifying such difference, when the temperature increases. In the meantime, the base-emitter voltage of the bipolar transistor Q2 is decreased and thus the voltage difference between two input signals of the differential amplifier DA2 is increased and the current flowing through the PMOS transistors P5 and P6 is decreased, when the temperature increases. As such, when the temperature increases, the current flowing through the PMOS transistor P7 is increased and the current flowing through the PMOS transistor P5 is decreased, and two currents are flowed into a node nd2 and changed to the first reference voltage signal VREF by the resistor R3. Since the currents flowing through the PMOS transistors P6 and P7 are controlled according to the temperature change, the level of the first reference voltage signal VREF remains uniform.

On the other hand, since the voltage difference in the input signal of the differential amplifier DA5 when the temperature increases, the current flowing through the PMOS transistor P2 is reduced and the temperature sensing voltage VTEMP is reduced. On the contrary, since the voltage difference in input signal of the differential amplifier DA5 is reduced when the temperature decreases, the current flowing through the PMOS transistor P2 is increased and the temperature sensing voltage VTEMP is increased. But, when the level of the temperature sensing voltage VTEMP is higher than that of the second reference voltage signal VULIMIT, the controller 30 clamps the level of the temperature sensing voltage VTEMP to the level of the second reference voltage signal VULIMIT.

More specifically, the unit gain buffer UG buffers a signal of the node nd1 in response to the second reference voltage signal VULIMIT until the signal of the node nd1 reaches to the level of the second reference voltage signal VULIMIT. The comparator 31 generates an output signal of high level and the NMOS transistor N1 is turned on to allow the temperature sensing voltage VTEMP to be outputted with a level of the second reference voltage signal VULIMIT, when the level of the temperature sensing voltage VTEMP is higher than that of the second reference voltage signal VULIMIT.

The temperature sensor circuit according to the exemplary embodiment of the present invention shown in FIG. 4 can reduce a trimming error by additionally controlling the temperature sensing voltage VTEMP.

First, the trimming process is performed at a high temperature to make the reference voltage signal VLLIMIT have the same voltage level as the temperature sensing voltage VTEMP. However, an error increases at a low temperature because the reference voltage signal VULIMIT also changes by a trimmed rate of the reference voltage signal VLLIMIT. To correct the error, the temperature sensing voltage VTEMP depending on the changed reference voltage signal VLLIMIT is generated.

The comparator 31 compares the temperature sensing voltage VTEMP with the reference voltage signal VULIMIT and outputs a low signal when the temperature sensing voltage VTEMP is higher than the reference voltage signal VULIMIT. A feedback path of the temperature sensing voltage VTEMP is disconnected by the low signal and the temperature sensing voltage VTEMP is clamped to the reference voltage signal VULIMIT.

Consequently, the reference voltage signal VULIMIT serves as the upper limit of the temperature sensing voltage VTEMP that is inversely proportional to temperature. Since the additional circuit does not affect the reference voltage signal VLLIMIT, the trimmed signal is not distorted at a high temperature.

Instead of the reference voltage signal VULIMIT, the output signal of the unit gain buffer can be used as a clamping source. The reason for this is that if the reference voltage signal VULIMIT is directly used, the voltage level of the voltage signal VREF may be distorted because of influence on charges of the temperature sensing voltage VTEMP.

Consequently, the error rate that has increased as temperature decreases is reduced at below a predetermined temperature. A simulation result is illustrated in FIG. 5, and an error rate according to the change of temperature is illustrated in FIG. 6.

As described above, the temperature sensor circuit according to the exemplary embodiment of the present invention compares the temperature sensing voltage VTEMP inversely proportional to temperature with the reference voltage signal VULIMIT and controls the voltage level of the temperature sensing voltage VTEMP according to the comparison result, thereby reducing the error rate even at a low temperature.

While the present invention has been described with respect to examples and exemplary embodiments, it will be apparent to those skilled in the art that various changes and modifications may be made without departing from the spirit and scope of the present disclosure and the following claims.

The present application claims priority to Korean patent application number 10-2007-63933, filed on Jun. 27, 2007, the entire contents which are incorporated herein by reference.

What is claimed is:

1. A temperature sensor circuit, comprising:
a first reference voltage generator configured to generate a first signal that linearly varies with temperature and a first reference voltage signal that maintains a certain level irrespective of temperature;
a second reference voltage generator configured to generate a second reference voltage signal by using the first reference voltage signal; and
a controller configured to compare the first signal with the second reference voltage signal and control a voltage level of the first signal according to a comparison result.

2. The temperature sensor circuit of claim 1, wherein the first signal has a negative temperature coefficient.

3. The temperature sensor circuit of claim 1, wherein the controller is configured to clamp the first signal to a voltage level of the second reference voltage signal when the first signal is higher than the second reference voltage signal.

4. The temperature sensor circuit of claim 1, wherein the controller comprises:
a comparator configured to compare the first signal with the second reference voltage signal; and
a clamper configured to clamp the first signal to a voltage level of the second reference voltage signal in response to an output signal of the comparator.

5. The temperature sensor circuit of claim 4, wherein the controller further comprises a buffer configured to buffer an output signal of the comparator.

6. The temperature sensor circuit of claim 4, wherein the clamper comprises:
a unit gain buffer configured to buffer an input signal in response to the second reference voltage signal; and
a driver configured to output an output signal of the unit gain buffer as the first signal in response to the output signal of the comparator.

7. The temperature sensor circuit of claim 4, wherein the clamper comprises:
a unit gain buffer configured to buffer an input signal in response to the second reference voltage signal; and
a transmission gate configured to transmit an output signal of the unit gain buffer in response to the output signal of the comparator.

8. A method for controlling a temperature sensor circuit, comprising:
generating a first signal that linearly varies with temperature and a first reference voltage signal that maintains a certain level irrespective of temperature;
generating a second reference voltage signal by using the first reference voltage signal; and
comparing the first signal with the second reference voltage signal and controlling a voltage level of the first signal according to a comparison result.

9. The method of claim 8, wherein the first signal has a negative temperature coefficient.

10. The method of claim 8, wherein the controlling of the voltage level of the first signal comprises clamping the first signal to a voltage level of the second reference voltage signal when the first signal is higher than the second reference voltage signal.

* * * * *